United States Patent [19]
Wawra et al.

[11] Patent Number: 5,436,825
[45] Date of Patent: Jul. 25, 1995

[54] ELECTRONIC CONTROL CIRCUIT FOR THE SUPPLY OF OHMIC-INDUCTIVE LOADS BY MEANS OF DIRECT-CURRENT PULSES

[75] Inventors: Manfred Wawra, Vienna; Geza Beszedics, Baden; Werner Winkler, Vienna; Franz Pavuza, Vienna; Walter Toriser, Vienna, all of Austria

[73] Assignee: Silent Motors, Vienna, Austria

[21] Appl. No.: 146,105

[22] PCT Filed: May 8, 1992

[86] PCT No.: PCT/AT92/00067

§ 371 Date: Apr. 8, 1994

§ 102(e) Date: Apr. 8, 1994

[87] PCT Pub. No.: WO92/20546

PCT Pub. Date: Nov. 26, 1992

[30] Foreign Application Priority Data

May 10, 1991 [AT] Austria ................... 973/91

[51] Int. Cl.6 .......................................... H02M 7/5387
[52] U.S. Cl. ........................................ 363/132; 363/17; 363/98
[58] Field of Search ................... 363/17, 56, 58, 97, 363/98, 131, 132; 318/254, 438

[56] References Cited

U.S. PATENT DOCUMENTS

| | | | |
|---|---|---|---|
| 4,048,552 | 9/1977 | Stone | 363/25 |
| 4,314,325 | 2/1982 | Siebert | 363/98 |
| 4,937,725 | 6/1990 | Dhyanchand et al. | 363/98 |
| 5,001,621 | 3/1991 | Egawa | 363/132 |
| 5,032,773 | 7/1991 | Frank | 318/254 |
| 5,132,888 | 7/1992 | Lo et al. | 363/17 |
| 5,204,809 | 4/1993 | Andersen | 363/132 |
| 5,377,094 | 12/1994 | Williams et al. | 363/132 |

FOREIGN PATENT DOCUMENTS

| | | | |
|---|---|---|---|
| 2613887 | 3/1988 | France | H02P 7/28 |
| 0024300 | 7/1980 | Germany | H02P 7/28 |
| 2705475 | 1/1986 | Germany | H02M 3/337 |
| 0412180 | 8/1989 | Germany | H02P 6/02 |
| 3940955 | 8/1990 | Germany | H02M 3/28 |

OTHER PUBLICATIONS

G. K. Dubey et al., "Step-Up Chopper Drive With Regeneration for Battery Operated Vehicle Control," IEEE-IAS Annual Meeting (1985).
Patent Abstract of Japan for JP 58-046874.

Primary Examiner—Thomas M. Dougherty
Assistant Examiner—Matthew V. Nguyen
Attorney, Agent, or Firm—Brumbaugh, Graves, Donohue & Raymond

[57] ABSTRACT

An electric control circuit for the supply of ohmic-inductive loads via direct-current pulses with changeable pulse use-ration encompasses a regulator featuring a transformer (T) wherein the transformer is designed as an autotransformer with a single continuous winding with center tap and taps symmetrical to the center tap, is connected on the primary side via electronic switches ($Q_3$, $Q_4$) bridged by freewheeling diodes in push-pull arrangement to a direct-voltage source (B) and, on the secondary side, is connected via electronic switches ($Q_5$, $Q_6$) which are symmetrical to the transformer (T) and are bridged by freewheeling diodes. Between the connection point of the connections facing away from the transformer (T) of the electronic switches ($Q_5$, $Q_6$) on the secondary side, and the pole of the direct-voltage source (B) which pole faces away from transformer (T), there is connected at least one series circuit of two electronic switches ($Q_1$, $Q_2$) which are bridged by freewheeling diodes, whose freewheeling diodes lie in reverse position to the freewheeling diodes of the two electronic switches ($Q_5$, $Q_6$) on the secondary side, wherein the load (M) is connected in parallel to one of the electronic switches connected in series.

7 Claims, 11 Drawing Sheets

PHASE 1 ———
PHASE 2 - - -

ELECTRONIC CONTROL CIRCUIT FOR THE SUPPLY OF OHMIC-INDUCTIVE LOADS BY MEANS OF DIRECT-CURRENT PULSES

BACKGROUND OF THE INVENTION

1. Field of the invention

The invention concerns an electronic control-circuit for the supply of ohmic-inductive loads by means of direct-current pulses with variable pulse duty-ratio—in particular of electronic motors, preferably those in whose stator or rotor a magnetic unidirectional field is produced; with a regulator that features a transformer; wherein on the primary side the transformer is connected in push-pull arrangement—via electronic switches that are bridged by freewheeling diodes—to a source of d.c. voltage; and on the secondary side is in connection—via electrical switches that are symmetrically connected to the transformer and[are bridged by freewheeling diodes—to the load; and wherein the transformer is preferably designed as an autotransformer with single continuous winding with center tap and taps that are symmetrical to the latter.

2. Description of the Prior Art

So-called step-down regulators [choppers], which consist of bipolar transistors, MOS field-effect transistors, or thyristors make it possible to achieve economically a partial-load operation of consumers, with supply from a source of d.c. voltage with constant voltage, because in this case one avoids losses such as those that occur in adjustable resistances which are inserted in the circuit ahead of the arrangement. This is of importance in such cases as, for instance, the operation of electric vehicles carried along, because by means of a low-loss partial-load operation such vehicles can greatly improve the autonomy achievable with one and the same battery charge.

In the most simple case, an electronic switch is in series with the source of d.c. voltage and with the electric motor, with an additional freewheeling-diode connected in parallel with the motor. The electrical energy which is supplied to the motor via the switch can be controlled by means of the pulse duty-ratio, between the closed and open condition of the switch. This is the most simple mode of operation, which corresponds to one-quadrant operation.

If the motor lends itself to being operated as a generator, independently of its speed of rotation, a two-quadrant operation is possible. In this case, the motor is not only electrically driven, but can also be braked electrically. In that case, the control circuit for supplying the motor encompasses a series-circuit of two electronic switches that is connected to the source of d.c. voltage, the electric motor being connected in parallel to one of these two switches. At any given moment, only one of the two electronic switches may be made conductive, while the other one must be blocked. The electronic switch connected in series with the source of d.c. voltage and with the motor is used for driving operation, as described earlier. For braking operations, the switch that is connected in series with the source of d.c. voltage and with the motor is opened, the motor operating as a generator; it may be short-circuited with the electronic switch that is in parallel with it. Assuming that the exciting fields stay the same, the voltage of the generator has the same polarity. However, the flow direction of the current is opposite to the one that occurs during operation as a motor. This means that in the case of a d.c. series-wound motor, the field winding must have its poles reversed for braking purposes. On the other hand, in the case of a motor with shunt characteristics—such as, for instance, a permanent-field motor—no special measures must be taken. By means of the short-circuiting of the motor which is functioning as a generator, a current that rises with time flows from the generator through the smoothing choke (which may be made up, for instance, by the motor winding); when the current circuit is opened, a self-induced voltage appears at the smoothing choke, which voltage, together with the generator voltage, exceeds the voltage of the source of d.c. voltage. This causes a flow of current which diminishes with time, flowing via the freewheeling diode of the other electronic switch provided for motor operation, towards the source of d.c. voltage (for instance, a battery), thus producing a recovery of energy. This is equivalent to two-quadrant operation. Upon reversing the direction of energy flow, the step-down regulator [chopper] becomes a step-up regulator [chopper]. In this fashion, even with very small generator voltages (low speed of rotation and/or low driving speed), energy can be regenerated.

If the direction of rotation of the motor is to be reversible, the voltage supplied to the motor must be capable of having its polarity inverted. This can be achieved by connecting, to the source of d.c. voltage, two parallel series-circuits with two electronic switches each, in a bridge-circuit fashion, and by connecting the motor as a bridge diagonal. The circuit is constructed symmetrically, whereby one bridge branch is operated, as described earlier, while the other branch provides a permanent connection with the chassis ground. Upon inverting the direction of rotation, the functions of the two branches are exchanged among themselves. This is equivalent to a four-quadrant operation.

In the case of more recent motor designs, it has been found advantageous to avoid the use of wear parts which feature a limited useful life—such as the commutator and, in particular, the brushes—and to replace these by electronic switches. This also improves commutation, with the elimination of any movable parts that carry current to the rotor, if the latter is equipped with permanent magnets and is provided with windings housed in the stator. In that case, one speaks of commutator-free direct-current motors,, or of electronically commutated direct-current motors (although these actually are synchronous motors with permanent excitation). In such a case, a selsyn is provided, with which the control of the windings is synchronized with the rotational position. In connection with an electronic control-circuit for the supply of such motors, the commutating switches may also be simultaneously used as switches for a step-down regulator [chopper]. With an appropriate design of the motor, the inductances of the winding may be used as smoothing chokes. For triggering purposes, an alternating-current bridge circuit should be provided.

If the nominal voltage of the motor is not approximately equivalent to the voltage of the source of d.c. voltage, this situation can be solved by using a so-called d.c. converter with a transformer. In the case of larger capacities, in particular, it is practical to use a push-pull circuit with symmetrical operation, in which circuit, once again, two electronic switches are provided on the secondary side of the transformer, which switches are led together at one point, between which point and the chassis-ground the motor is connected. The electronic switches on the primary side are turned-on and turned-off alternatingly, though not following each other continuously in a gapless manner. In this fashion, the voltage of the source of d.c. voltage is transformed in accordance with the voltage ratio r of the transformer, in each case the freewheeling diode of one of the two electronic switches on the secondary side being conductive, and the current rising through the smoothing choke and the load. Immediately after turning off the respective electronic switch on the primary side, the current can continue to flow through the smoothing choke, in that the current divides up symmetrically over the two winding halves of the transformer and over the two freewheeling diodes of the electronic switches on the secondary side. In this situation the transformer is being operated in a bifilar manner, and there is no induction effect on the primary side. Furthermore, the decaying magnetizing current of the transformer superposes in an asymmetric manner. During braking with the regeneration of energy, the electronic switches on the primary side remain open. In that case, at first the two electronic switches on the secondary side are closed, the current in the smoothing choke increases, and the transformer is therefore being operated in a bifilar manner so that no inductive effect occurs. Immediately thereafter, one of the two electronic switches on the secondary side is opened, whereby the sum made up of the inductive voltage of the smoothing choke and the generator voltage is transformed back into the source of d.c. voltage, and the flow of current into the source of d.c. voltage is made possible, via the freewheeling diode of one of the two electronic switches on the primary side. Such a converter is also appropriate for two-quadrant operation.

In principle, almost any voltage conversion can be carried out with the known circuit arrangements, as long as an appropriate pulse duty-ratio is set for the electronic switches. With the additionally provided transformer of the d.c. converter, a fixed adjustment can be carried out over a wide range. However, the dynamic range (from the lowest to the highest input-voltage) must be carried out via the variation of the pulse duty-ratio. This represents a weak point of the known circuit arrangements: while it is true that extreme pulse duty-ratios can be set (for instance, values below 0.1 or over 0.9), nonetheless the efficiency changes drastically at the boundaries of the range. This is connected with the fact that the power transferred is proportional to the mean value of the current, but the power loss in the electronic switches made up of transistors is proportional to the square of the rms current. The ratio of mean value to rms value deteriorates with an increasing pulse duty-ratio p or (1-p).

The invention aims at providing an electronic control-circuit for the supply of ohmic-inductive loads by means of direct-current pulses with a changeable pulse duty-ratio, which [electronic control-circuit] will permit that as large as possible a dynamic voltage range be achieved, without an excessive variation of the pulse duty-ratio. Such an arrangment is necessary in particular in the case of vehicle drives.

SUMMARY OF THE INVENTION

In order to solve this task, in the case of an electronic control-circuit of the type described at the outset, the invention consists essentially in that between the linkage point of the connections of the electronic switches on the secondary side—which [connections] face away from the transformer—and the pole of the source of d.c. voltage—which [pole] faces away from the transformer—there is connected at least one series-circuit of two electronic switches which are bridged by freewheeling diodes, the freewheeling diodes of which [switches] lie in opposite sense to the freewheeling diodes of the two electronic switches on the secondary side. In the process, the load is connected in parallel to one of the electronic switches that are connected in series. Alternatively, the circuit can be made in a manner such that the load is connected between the linkage point of the connections of the electronic switches on the secondary slide—which [connections] face away from the transformer—and the pole of the source of d.c. voltage—which [pole] faces away from the transformer; and that, in series with the source of d.c. voltage, there is provided an electronic switch which is bridged by a freewheeling diode, the freewheeling diode of which switch lying in opposite sense to the freewheeling diodes of the two electronic switches on the secondary side; or [can be made in a manner such] that to the source of direct current is connected a half-bridge in the form of a series circuit of two electronic switches which are bridged by freewheeling diodes, whose [half-bridge's?] midpoint is linked to the load on the; side facing away from the transformer.

By means of this combination of electronic switches forming a chain and through the appropriate control of the individual switches, there is made available a step-down regulator [chopper] as well as a modified transformer/step-down regulator [chopper] for the driving operation. The motor to be controlled can be operated by the voltage of the source of d.c. voltage via the step-down regulator [chopper] in a speed-of-rotation range of a "low gear," in which case the electronic switches on the primary side of the direct-voltage converter are not in operation. After the direct-voltage converter has been placed in operation, the rotational range of a "second gear" can be run through, via the step-down regulator [chopper] on the secondary side; in this case, an operating voltage that is appropriately higher than the voltage of the source of d.c. voltage must be provided. In so doing, the electronic switch connected in parallel to the motor must be triggered synchronously to the alternatingly-triggered electronic switches on the primary side.

Finally, a third type of operation is possible, in which the electronic switch that is in series with the motor (of the two electronic switches connected in series) is always conducting, and consequently the rise in current is equivalent to that of the second case of operation, but the drop in current is achieved by opening the electronic switch that had been respectively closed on the primary side. This has the consequence that the smoothing choke is now discharged, no longer against the chassis ground, but instead against the voltage of the source of d.c. voltage.

The alternative solution provided above permits the same functions, while saving one electronic switch. In so doing, the action of the now-eliminated electronic switch, previously connected in parallel to the motor, is achieved by the fact that the two electronic switches on the primary side are simultaneously closed.

In order to arrive at the necessary function of the smoothing choke—without the need to have to provide the choke as a separate, lumped component—the arrangement can be made in a manner such that the load is made up by a d.c.-commutator motor with a permanent-magnet stator, and an iron-free rotor, the armature inductance of the latter serving as a smoothing choke. In that case, a specific design that is particularly advantageous for vehicles is one in which the rotor is designed as an iron-free disk rotor. This makes it possible to accommodate the drive motor (plus any step-down gearing that may be required) in a wheel hub of limited axial length.

A design for this arrangement, providing long servicing intervals without the need to check for the wear of carbon brushes, features the characteristic that the load is made up of a so-called commutator-free direct-current motor with a selsyn, a permanent-magnet rotor, and several stator phase-transducers. In that case, the number of the series-circuits (each with two electronic switches bridged by freewheeling diodes) which are connected, between the linkage point of the connections of the electronic switches on the secondary side— which [connections] face away from the transformer— —and the pole of the source of d.c. voltage—which [pole]faces away from the transformer—is equivalent to the number of stator phase-windings.

A further development of the control circuit consists in that, in the case of a motor for both directions of rotation, the motor and/or each winding of the motor lie in the diagonal of a bridge circuit made of electronic switches bridged by freewheeling diodes, wherein all bridge circuits are connected between the linkage point of the connections of the electronic switches on the secondary side, which [connections] face away from the transformer, and the pole of the source of d.c. voltage which [pole] faces away from the transformer.

BRIEF DESCRIPTION OF THE DRAWINGS

Below, the invention shall be explained in greater detail with the aid of the examples of embodiment shown in the drawing and by means of operating diagrams. The following are shown.

DETAILED DESCRIPTION

Figure 1:
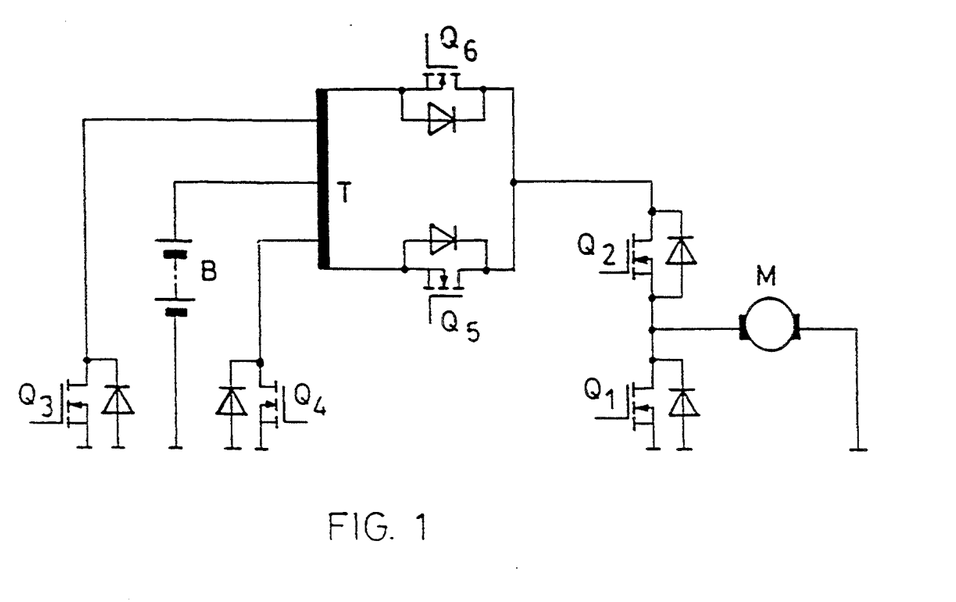
FIG. 1, a first form of embodiment of the control circuit according to the invention.

In the case of the first form of embodiment of an electronic control-circuit according to the invention, as shown in FIG. 1, all electronic switches are made up of MOS field-effect transistors, $Q_1$ to $Q_6$. A source of d.c. voltage B is made up of a battery; as the motor M to be controlled, a permanent-field commutator motor is provided. In order to be able to operate the step-down regulator [chopper]formed by the transistors Q1 and Q2, with the voltage of the source of d.c. voltage B or a higher voltage, a transformer T in the form of an autotransformer is provided. Thanks to the design of transformer T as an autotransformer, less wiring material is required for the windings; when needed, the consumer can nonetheless achieve a voltage made up of the sum of the voltage of the source of d.c. voltage B and the transformed voltage. However, the physical size of transformer T is solely a function of the transformed power, inasmuch as the steady component—which is derived directly from the source of d.c. voltage B— passes through the transformer T in a bifilar manner.

With transistors Q3, Q4 blocked, the current moves from the source of d.c. voltage B in a bifilar manner, via transformer T and the freewheeling diodes of transistors Q5, Q6 (with blocked transistor Q1, via transistor Q2) to the motor M. The transistors Q1 and Q2, in case of driving operation, are alternately opened and closed in the first "gear", in accordance with a pulse duty-ratio $p = t_{on}/(t_{on} + t_{off})$—where $t_{on}$ and $t_{off}$ refer to the operating manner of transistor Q2 and where the sum of $t_{on}$ and $t_{off}$ is the cycle time T. The effective operating voltage of motor M in that case is equal to $U_{mot} = p*U_{batt}$.

A second "gear" of motor M is the result of using the voltage transformation of transformer T, in which case, for the operation of the voltage transducer, $Q_3$ and $Q_4$ must be alternatingly triggered in synchronous fashion with $Q_1$. The effective operating voltage of the motor M is then $U_{mot} = p*(1+r)*U_{batt}$, where r is the voltage ratio of transformer T.

Finally, motor M can be operated in a third "gear" in which Q2 is always conductive and the current rise is therefore equivalent to the one of the second gear, but the current drop is achieved by switching off Q3 or Q4. This has the result that the smoothing choke made up by the rotor winding of motor M is discharged no longer against the chassis ground, but instead against the voltage $U_{batt}$ of the source of d.c. voltage B. In that case, there results a further transforming characteristic, and the effective operating voltage of the motor M is then $U_{mot} = (1+r*p)*U_{batt}$.

Figure 2:
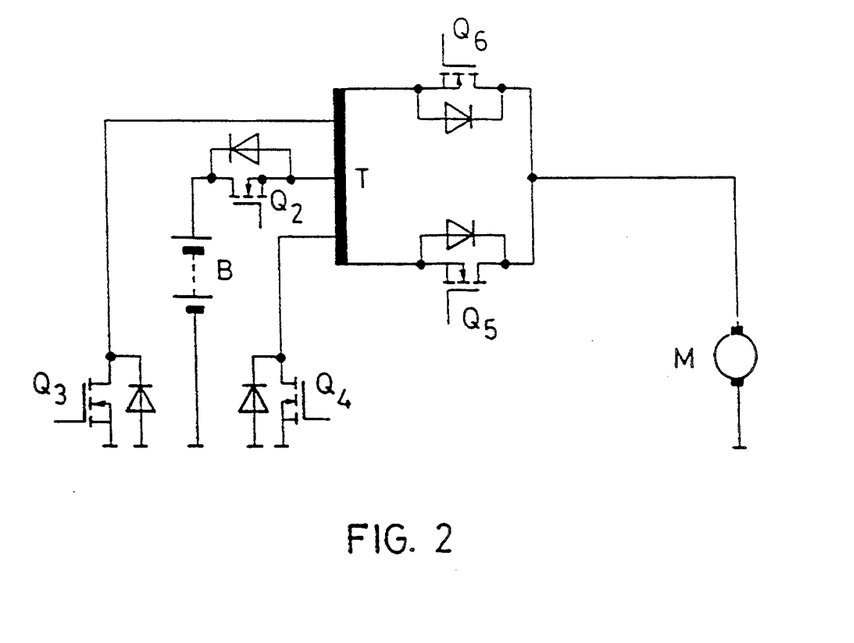
FIG. 2, a second form of embodiment of the control circuit according to the invention.

A derivative form of embodiment of the control circuit according to the invention is shown in FIG. 2. With it, all previously discussed functions can be achieved, however the need to use transistor $Q_1$ is eliminated in that, in lieu of a triggering of Q1, the transistors $Q_3$ and $Q_4$ are simultaneously brought to the conductive condition.

Figure 3:
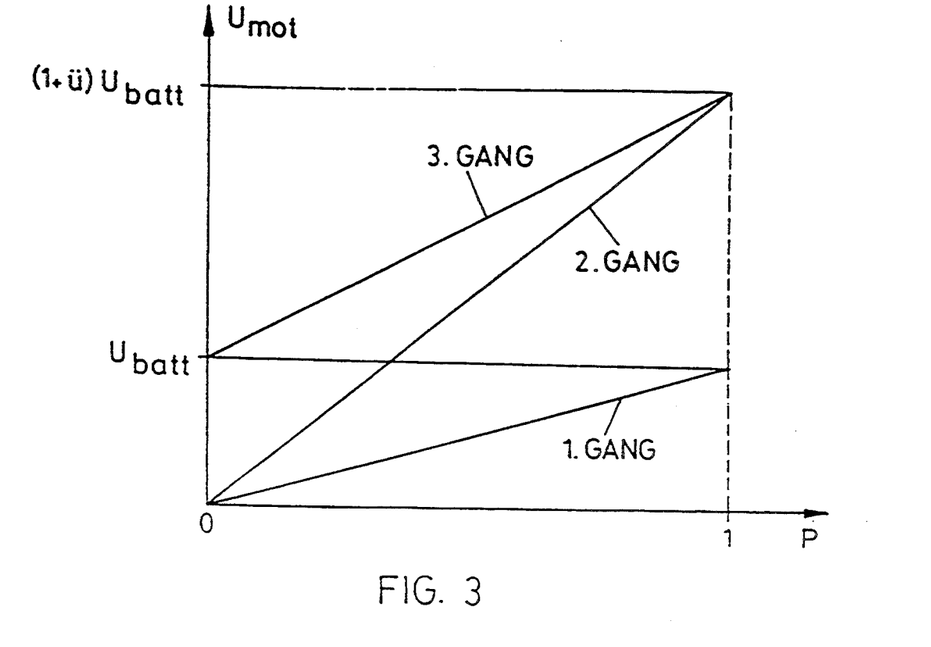
FIG. 3 in a diagram, a schematic representation of the operating cases that may be achieved with the control circuit according to the invention.
Figure 4:
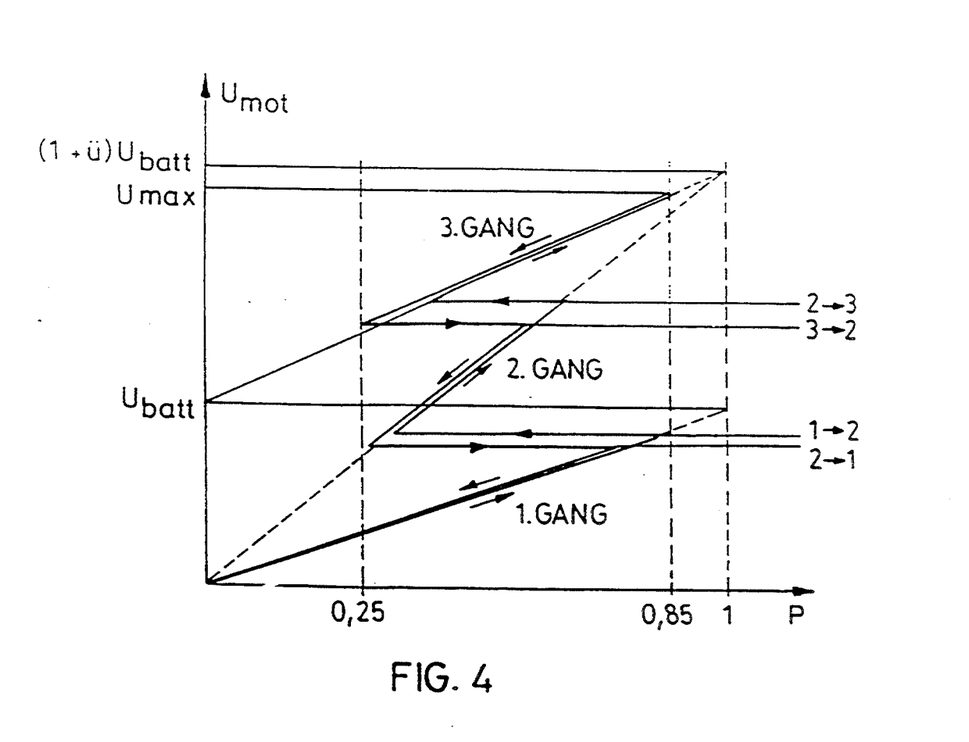
FIG. 4, the various operating cases upon acceleration and deceleration, with greater details.
Figure 5:
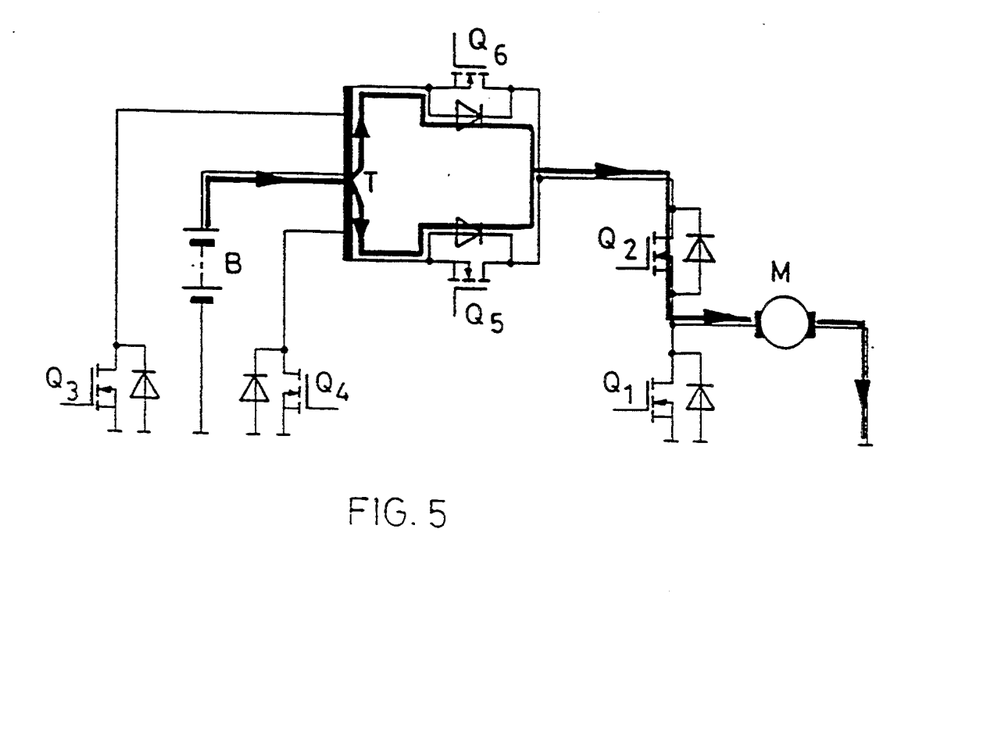
FIGS. 5 to 16, the respective current variation in the various operating conditions, with a variety of shifts ["gears"], for driving operation and for braking operation.

FIG. 3 shows in schematic fashion a comparison of the voltage transformation for the three "gears" of motor M, while FIG. 4 shows in greater detail how the entire supply-voltage range from 0 to $(1+r)*U_{batt}$ can be run through, by means of changes in the manner of operation (electronic gear-switching) with specific operating-voltages supplied to the motor, without the pulse duty-ratio p exceeding predetermined upper and lower limits. The changes between the individual modes of operation are generally equivalent to the function of a mechanical gear-shift, so that it is legitimate to speak of electronic or electric "gears." The advantage, as compared to a mechanical gearshift-mechanism, lies in the fact that [for operation] it suffices to change the firing of the transistor switches. This can be carried out with little effort [expense] by means of electronic logic combinations, and can be effected within one switching cycle, in a manner such that there occurs no noticeable interruption of the flow of energy and/or of the torque. A mechanical coupling such as is used in speed-shift gearing is not necessary in this case. Furthermore, the electronic gearshift can be automated by means of two comparators, which compare the motor voltage with predetermined switching thresholds.

An important criterion in order to achieve a high efficiency when operating transistors as switches requires that minimum switched-on and switched-off times be maintained. A further criterion demands that the current ripple (motor-current change within one switching cycle) be maintained within limits. The current ripple is the result of the height of the voltage change between the switched-on and switched-off phase at the smoothing choke and the latter's inductance, as well as of the absolute duration of the respective switched phase ($t_{on}$, $t_{off}$). The change in voltage within one cycle is dependent on the electrical "gear." However, the voltage ratio is solely a function of the ratio of the switched phases ($t_{on}:t_{off}$). This problem cannot be solved in a satisfactory manner with traditional pulse-duration modulators with a fixed cycle-time ($T = t_{on} + t_{off}$).

Consequently, in the arrangement according to the invention the respective switched time is not predetermined. Instead, it is monitored, for practical reasons, by regulating the current-ripple itself.

In FIGS. 5 to 8, the changes in the current are plotted for the individual operating conditions of the first "gear", in the case of a circuit arrangement according to FIG. 1.

Figure 6:
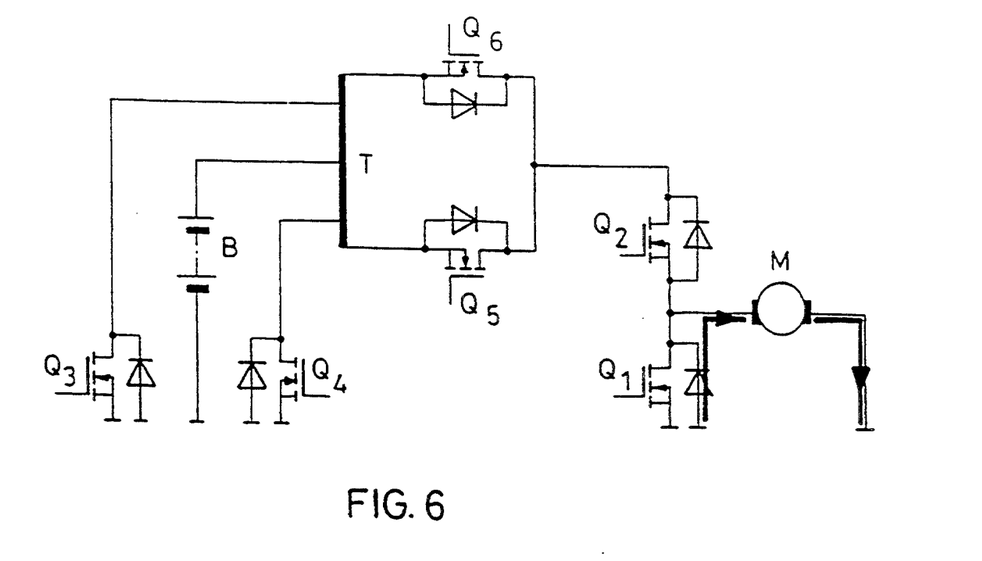

In the case of acceleration and driving at uniform speed in the first "gear," the d c. converter with the transistors $Q_3$ and $Q_4$ is out of operation; the transistors $Q_5$ and $Q_6$ on the secondary side are turned-off; and by the same token the transistor $Q_1$ is permanently turned off. The proportioning of the current to be supplied to the motor M from the source of d.c. voltage B (which current flows in bifilar manner via the transformer T and the freewheeling diodes of the transistors $Q_5$ and $Q_6$) is carried out by means of periodically switching on and off the transistor $Q_2$. The state of current-flow from the source of d.c. voltage B is entered in FIG. 5 with thick lines. Because of the effect of the smoothing choke contained in motor M, the flow of current through the motor does not suddenly stop after the transistor $Q_2$ has been turned off; instead, a current that decreases with time continues to flow in the same direction via the freewheeling diode of transistor $Q_1$, through the motor M. This situation is shown in FIG. 6.

Figure 7:
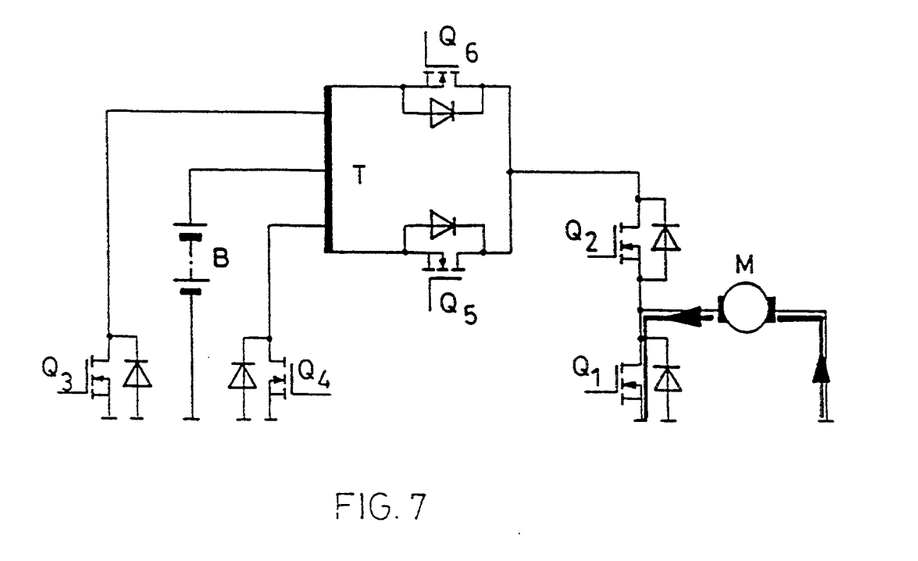
Figure 8:
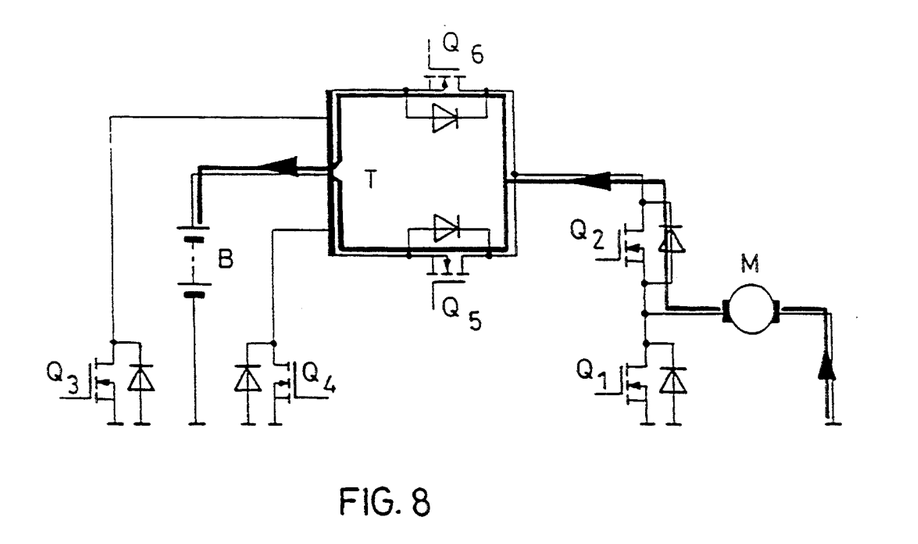

In order to brake the motor when it is running as a generator (in which case the polarity of the voltage is the same as during motor operation, but the current is flowing in an opposite direction), the transistors $Q_3$ and $Q_4$ of the voltage transducer are turned off, while the transistor $Q_2$ is also turned off; the transistors $Q_5$ and $Q_6$, on the other hand, are conductive. When, at a high speed of rotation, the motor M produces a voltage that is greater than the voltage of the source of d.c. voltage B, there occurs a current return-delivery—via the freewheeling diode of transistor $Q_2$, via the conductive transistors $Q_5$ and $Q_6$, as well as, in bifilar manner, via the transformer T—to the source of d.c. voltage B. In the case of lower speeds of rotation of the motor M (to the point of almost completely stopping) voltage peaks may be produced by the periodic closing and opening of the transistor $Q_1$ (i.e. by means of periodic short-circuiting of the motor running as a generator and of the smoothing-choke contained in it), which voltage peaks, immediately after the switching-off of transistor $Q_1$, are greater than the voltage of the source of d.c. voltage B, so that a return-delivery of energy to the source of d.c. voltage can be achieved, via the freewheeling diode of the transistor $Q_2$, even in the case of low rotational speeds of the motor. This is shown in FIGS. 7 and 8.

Figure 9:
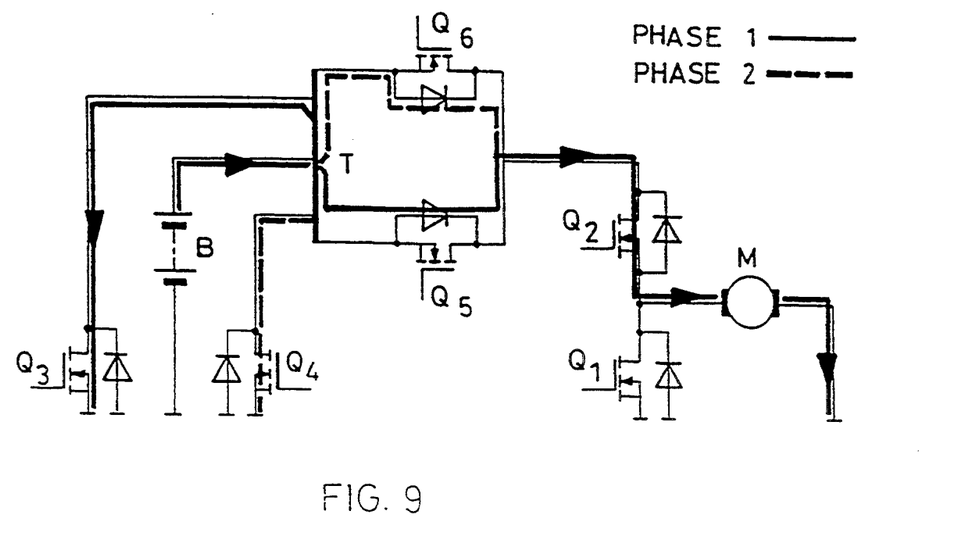
Figure 10:
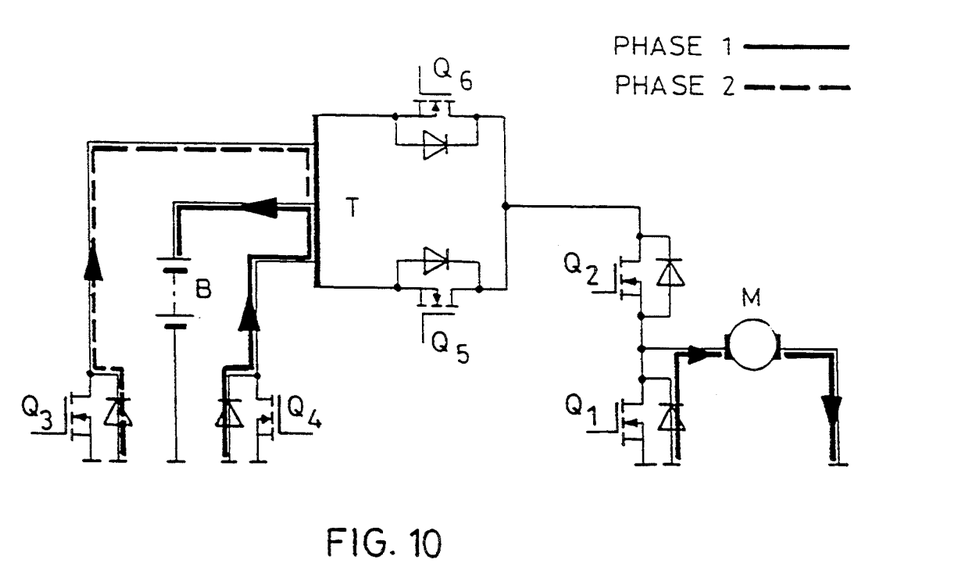

In the case of accelerating or driving at uniform speed in the second "gear, " the transistors $Q_3$ and $Q_4$ of the d.c converter are alternatingly brought into the conductive state. In cadence with the turning-on of transistor $Q_3$ and transistor $Q_4$, transistor $Q_2$ is also made conductive every time, whereupon current flows from transformer T to the motor M via the freewheeling diode of the blocked transistor $Q_5$ or via the freewheeling diode of the blocked transistor $Q_6$ (FIG. 9). After the transistor $Q_2$ has been turned off, a current that decreases with time continues to flow to the motor via the freewheeling diode of the turned-off transistor $Q_1$ (FIG. 10).

Figure 11:
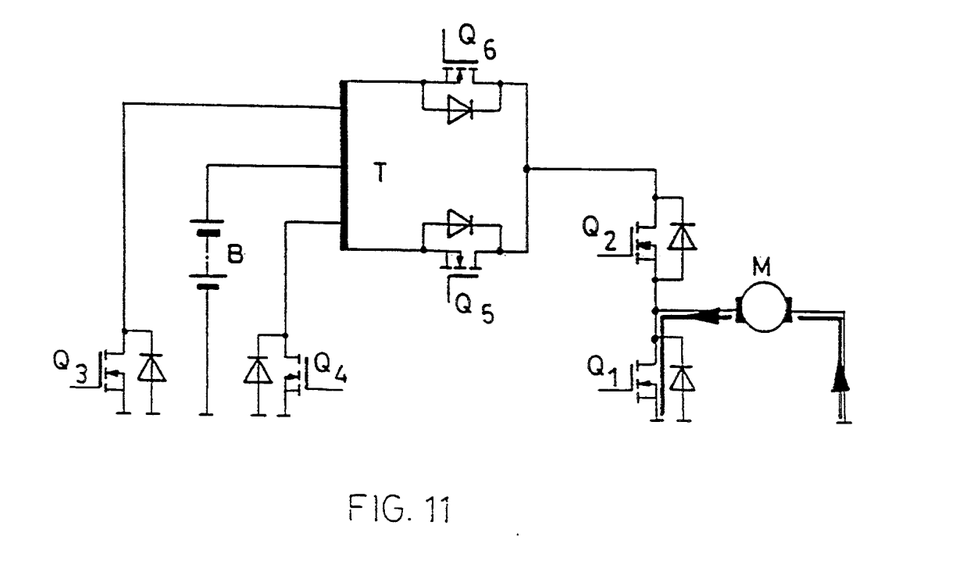
Figure 12:
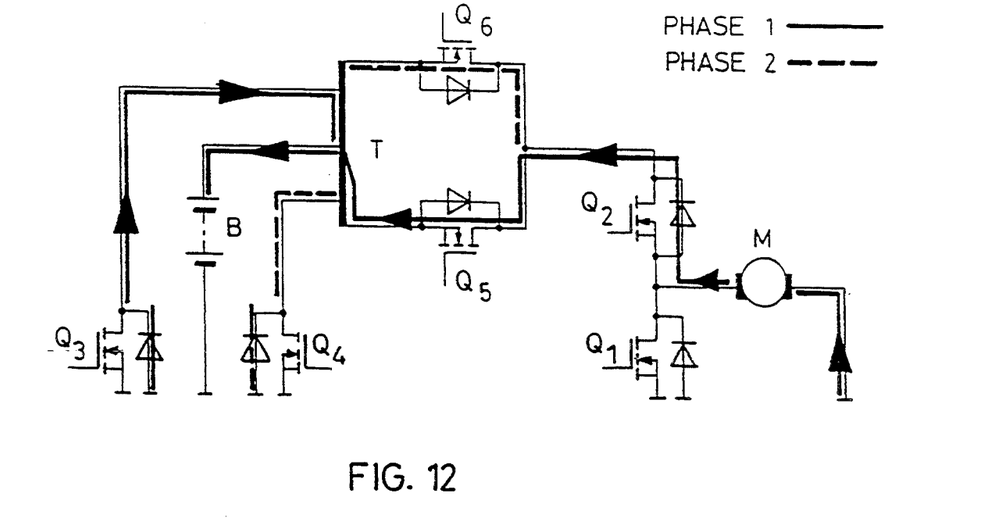

In case of braking in the second "gear," the transistors $Q_3$ and $Q_4$ of the d.c. converter, as well as the transistor $Q_2$, remain turned off. The transistor $Q_1$ is turned on and off in clocked fashion, while the transistors $Q_5$ and $Q_6$ are alternatingly turned on and off. By means of the periodic short-circuiting of motor M and the smoothing choke contained in it, there are produced voltage pulses which reach the transformer T via the freewheeling diode of the blocked transistor $Q_2$ and via the transistors $Q_5$ or $Q_6$ which are alternatingly controlled to be conductive, and [which voltage pulses] are supplied to the direct-voltage source B, in accordance with the voltage ratio of transformer T (FIGS. 11 and 12).

Figure 13:
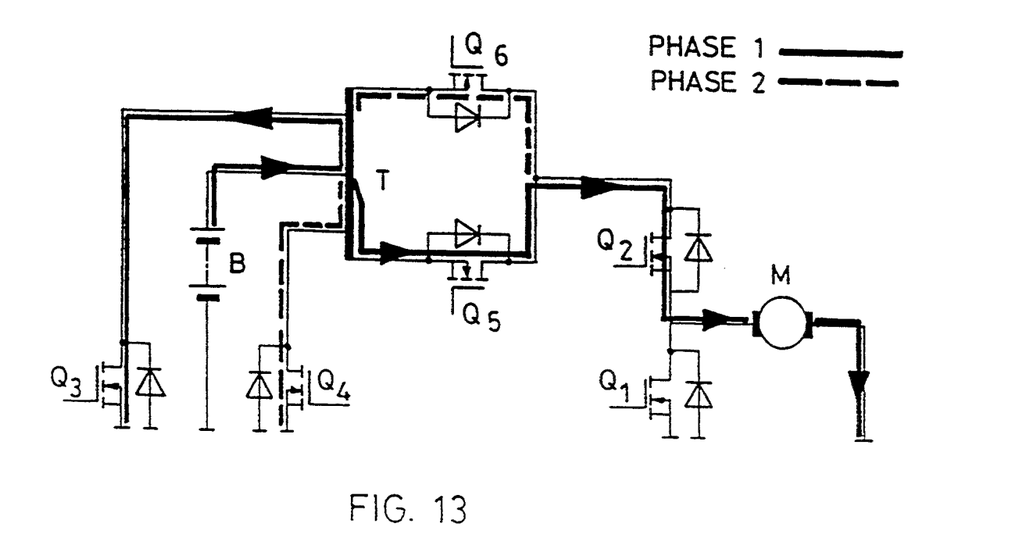
Figure 14:
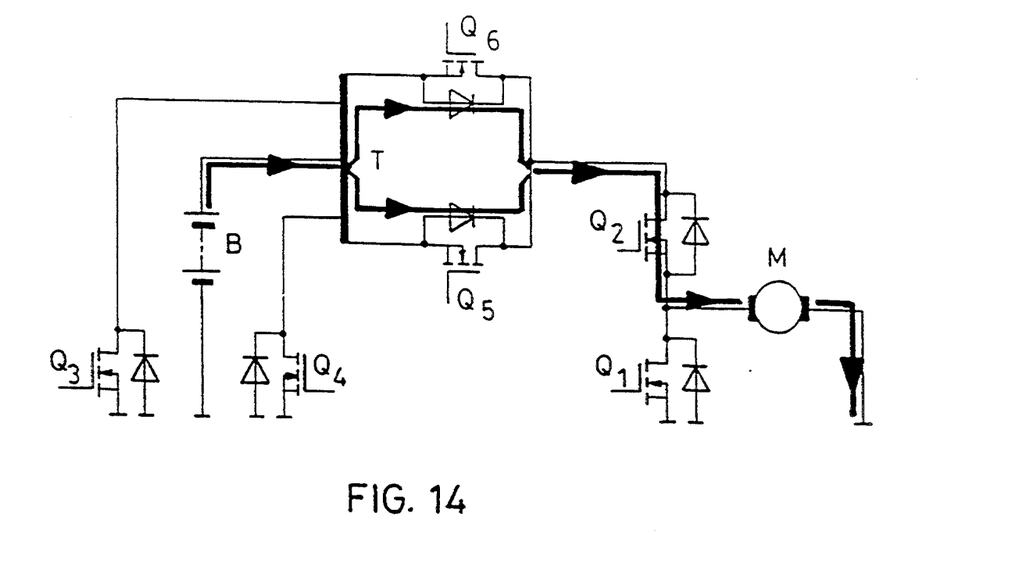

For the purpose of accelerating or driving at uniform speed in the third "gear"—with the transistors $Q_1$, $Q_5$, and $Q_6$ being turned off and the transistor $Q_2$ being turned on—the voltage converter with the transistors $Q_3$ and $Q_4$ is turned on and off; in the turned-on condition of the voltage converter, transistors $Q_3$ and $Q_4$ are alternatingly triggered. In the process, during the clocked operation of the voltage transducer, the current-flow towards the motor M occurs respectively over one-half of the transformer winding and the corresponding freewheeling diode of the transistor $Q_5$ or $Q_6$ and the transistor $Q_2$; with the d.c. converter stopped, [the current-flow occurs] in bifilar manner via the transformer T and the freewheeling diodes of the two transistors $Q_5$ and $Q_6$ as well as the turned-on transistor $Q_2$ (FIG. 13 and 14).

Figure 15:
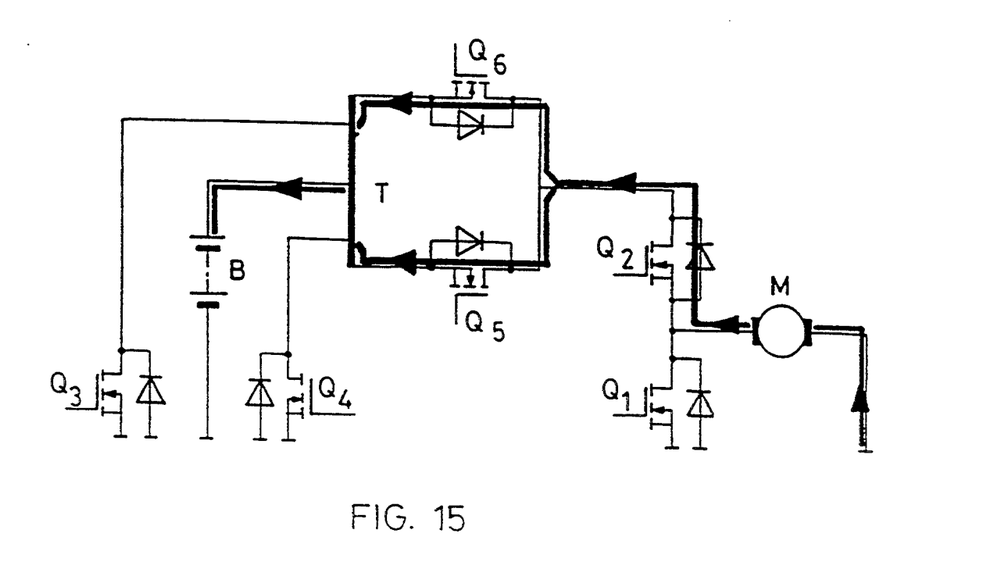
Figure 16:
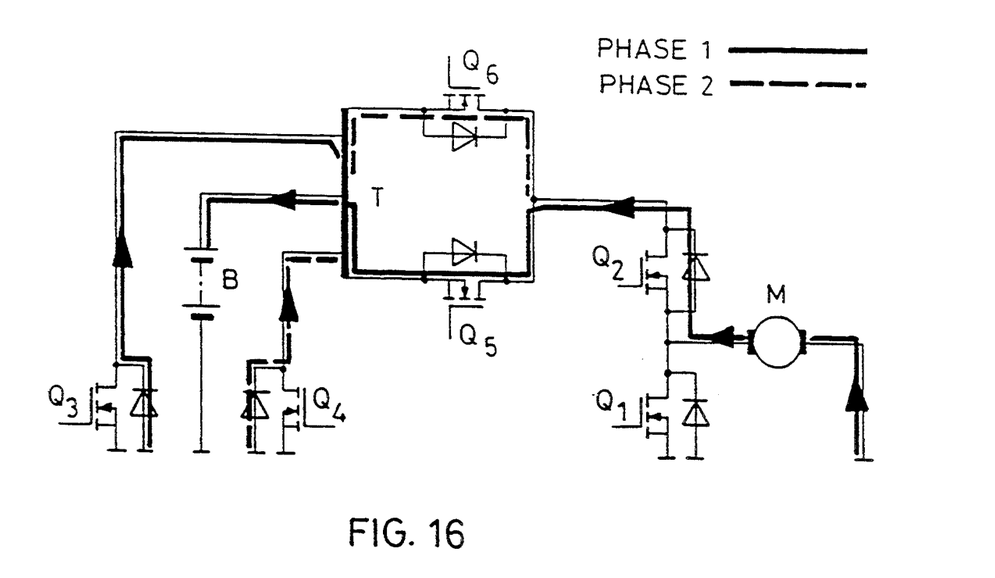

In the case of braking in the third "gear," there occurs the "short-circuiting" of the fast-running motor M, via the freewheeling diode of the transistor $Q_2$, via the two turned-on transistors $Q_5$ and $Q_6$, as well as—in a bifilar manner—via the transformer T to the direct-voltage source B. Furthermore, in a periodic alternation to the preceding, the transistors $Q_5$ and $Q_6$ are controlled alternatingly to be conductive, so that the energy return-supply is carried out in a transformer-like fashion, and the current circuit is closed in primary fashion, alternatively via respectively one freewheeling diode of the transistors $Q_3$ and $Q_4$ (FIGS. 15 and 16).

Figure 17:
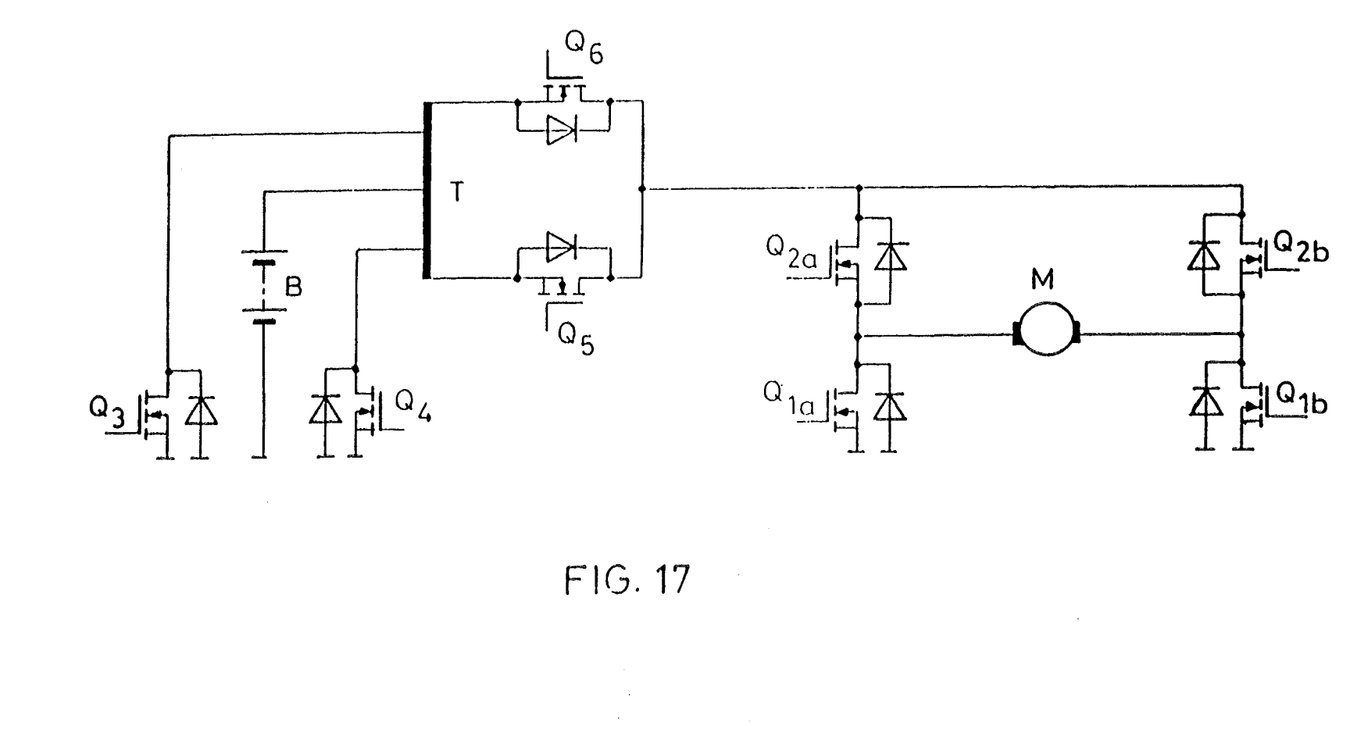
FIG. 17, a form of embodiment of the control circuit for a commutator motor that is capable of being driven and of being braked, in both directions of rotation.

FIG. 17 shows an extension of the circuit arrangement for the optional operation of a motor M in both directions of rotation, where in lieu of the transistors $Q_1$ and $Q_2$ in FIG. 1 there is provided a bridge circuit made of four transistors $Q_{1a}$, $Q_{2a}$, $Q_{1b}$, $Q_{2b}$. In this fashion a four-quadrant operation is made possible, whereby, for instance, in the case of driving in one direction the transistor $Q_{1b}$ is closed permanently and the transistor $Q_{2a}$ is operated in clocked fashion, while the transistors $Q_1a$ and $Q_2b$ are permanently turned off. For the other direction of rotation, $Q_1a$ is permanently closed and $Q_2b$ is controlled to be turned on in clocked fashion, while $Q_1b$ and $Q_2a$ are permanently turned off.

Figure 18:
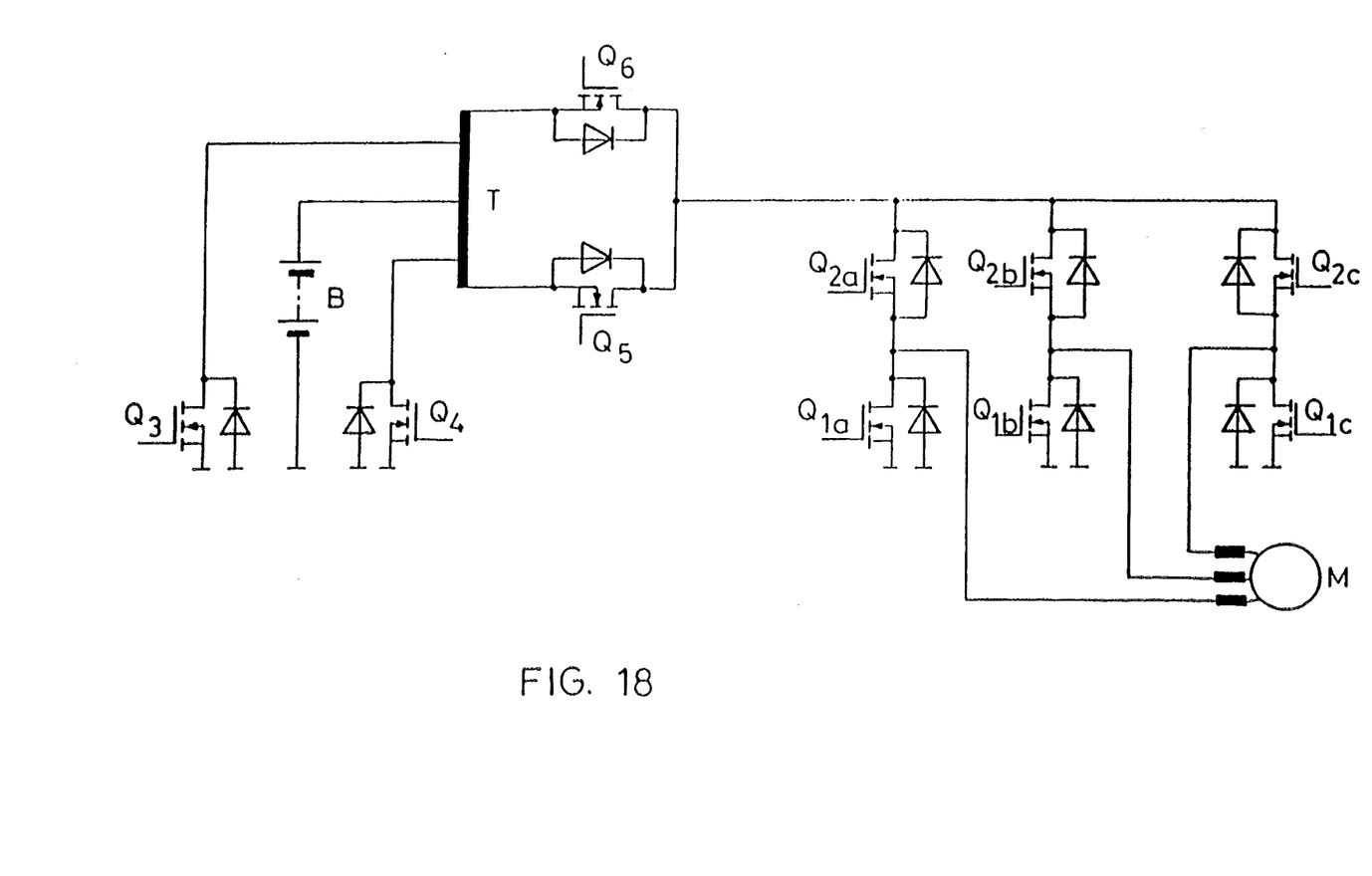
FIG. 18, a form of embodiment of the control circuit for a commutator-less d.c. motor.

Finally, FIG. 18 shows an arrangement for a commutator-less direct-current motor M, which features a permanent-magnet rotor without moving parts for current feeds, and a stator with three phase-windings. The number of phase windings could also be greater than three. In comparison to the arrangement according to FIG. 1, in this case there are provided a number of series-circuits of two transistors each, $Q_1a$, $Q_2a$; $Q_1b$, $Q_2b$; $Q_1c$, $Q_2c$, the number of which [series-circuits] is equivalent to the number of phase windings.. The series-circuits are to be controlled so as to be conductive in a manner that is cyclically successive in time.

Figure 19:
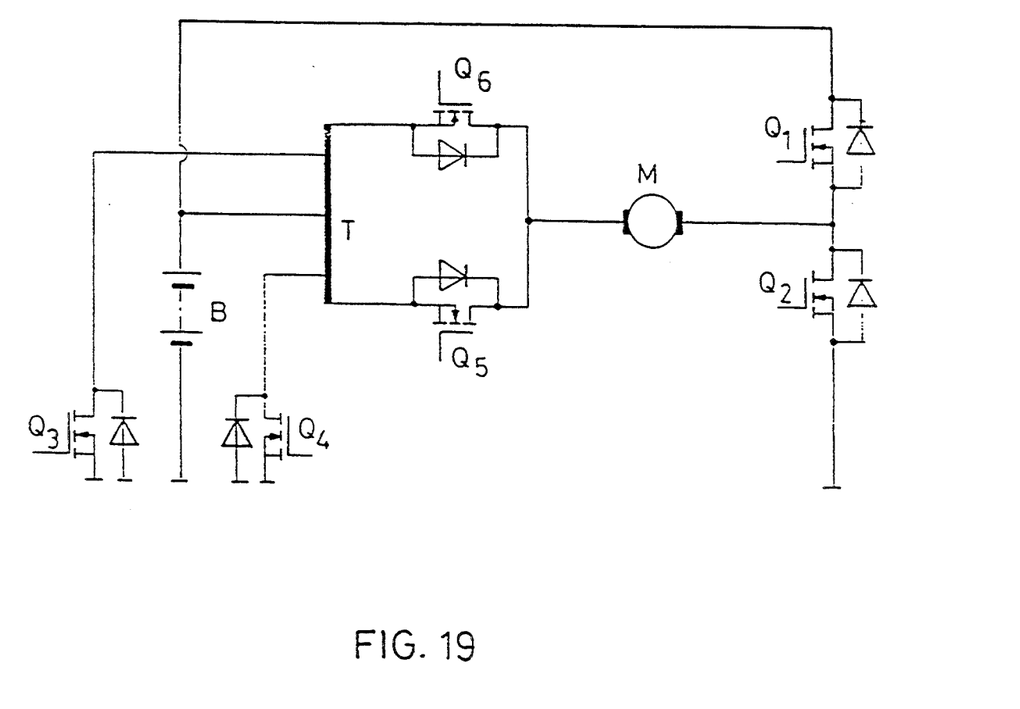
FIG. 19, a third form of embodiment of the control circuit according to the invention.

FIG. 19 shows a further form of embodiment, in which the load (and/or the motor) lies with the linkage point of the connections of the electronic switches on the secondary side, which [connections] face away from the transformer, and the midpoint of a half-bridge of the switches and/or transistors that are bridged by freewheeling diodes, which [half-bridge?] is connected with the source of direct voltage B.

We claim:

1. An electronic control circuit for the supply of ohmic-inductive loads (M) by means of direct-current pulses with variable pulse duty-ratio, comprising:
   a source of D.C. voltage (B);
   a transformer (T) having a primary and secondary side, the transformer (T) being connected on the primary side in a push-pull arrangement to the source of D.C. voltage (B) via electrical switches ($Q_3$, $Q_4$) which are bridged by freewheeling diodes, and the transformer (T) being connected on the secondary side to the load (M) via electrical switches ($Q_5$, $Q_6$) which are symmetrically connected to the transformer (T) and are bridged by freewheeling diodes; and
   at least one series-circuit of two electronic switches ($Q_1$, $Q_2$; $Q_{1a}$, $Q_{1b}$, $Q_{1c}$, $Q_{2a}$, $Q_{2b}$, $Q_{2c}$) which are bridged by freewheeling diodes lying in opposite sense to the freewheeling diodes of the electronic switches ($Q_5$, $Q_6$) on the secondary side of the transformer (T), said series-circuit being connected between a linkage point of the connections of the electronic switches ($Q_5$, $Q_6$) on the secondary side, which connections face away from the transformer (T), and the pole of the source of D.C. voltage (B) facing away from the transformer (T);
   wherein the load (M) is connected in parallel to one of the switches which are connected in series.

2. An electronic control circuit for the supply of ohmic-inductive loads (M) by means of direct-current pulses with variable pulse duty-ratio, comprising:
   a source of D.C. voltage (B);
   a transformer (T) having a primary and secondary side, the transformer (T) being connected on the primary side in a push-pull arrangement to the source of D.C. voltage (B) via electrical switches ($Q_3$, $Q_4$) which are bridged by freewheeling diodes, and the transformer (T) being connected on the secondary side to the load (M) via electrical switches ($Q_5$, $Q_6$) which are symmetrically connected to the transformer (T) and are bridged by freewheeling diodes; and
   an electronic switch ($Q_2$) which is bridged by a freewheeling diode lying in opposite sense to the freewheeling diodes of the electronic switches ($Q_5$, $Q_6$) on the secondary side of the transformer (T), said switch being connected between the source of D.C. voltage (B) and the primary side of the transformer (T);
   wherein the load (M) is connected between a linkage point of the connections of the electronic switches ($Q_5$, $Q_6$) on the secondary side, which connections face away from the transformer (T), and the pole of the source of D.C. voltage (B) facing away from the transformer (T).

3. An electronic control circuit for the supply of ohmic-inductive loads (M) by means of direct-current pulses with variable pulse duty-ratio, comprising:
   a source of D.C. voltage (B);
   a transformer (T) having a primary and secondary side, the transformer (T) being connected on the primary side in a push-pull arrangement to the source of D.C. voltage (B) via electrical switches ($Q_3$, $Q_4$) which are bridged by freewheeling diodes, and the transformer (T) being connected on the secondary side to the load (M) via electrical switches ($Q_5$, $Q_6$) which are symmetrically connected to the transformer (T) and are bridged by freewheeling diodes; and
   at least one series-circuit of two electronic switches ($Q_1$, $Q_2$; $Q_{1a}$, $Q_{1b}$, $Q_{1c}$, $Q_{2a}$, $Q_{2b}$, $Q_{2c}$) which are bridged by freewheeling diodes lying in opposite sense to the freewheeling diodes of the electronic switches ($Q_5$, $Q_6$) on the secondary side of the transformer (T), said series-circuit forming a half-bridge with the source of D.C. voltage (B);
   wherein the load (M) is connected between a linkage point of the connections of the electronic switches ($Q_5$, $Q_6$) on the secondary side, which connections face away from the transformer (T), and a midpoint of the half-bridge.

4. Control circuit according to claim 1, 2 or 3, characterized in that the load (M) is formed by a direct-current commutator motor with a permanent-magnet stator and an iron-free rotor, whose armature inductance serves as a smoothing choke.

5. Control circuit according to claim 4, characterized in that the rotor is designed as an iron-free disk rotor.

6. Control circuit according to claim 1, 2 or 3, characterized in that the load (M) is formed by a commutator-less direct-current motor with a selsyn, a permanent-magnet rotor, and several stator phased-windings, wherein the number of the series-circuits (each with two electronic switches (Q1a, Q1b; Q1c, Q2a, Q2b, Q2c) bridged by freewheeling diodes) which are connected between the linkage point of the connections of the electronic switches (Q5, Q6) on the secondary side—which face away from the transformer (T)—and the pole of the source of d.c. voltage (B)—which faces away from the transformer (T)—is equivalent to the number of stator phase-windings.

7. Control circuit according to claim 6, characterized in that, in the case of the motor (M) for both directions of rotation, the motor and/or each winding of the motor lies in the diagonal of a bridge circuit made of electronic switches (Q1a, Q1b; Q2a, Q2b) bridged by freewheeling diodes, wherein all bridge circuits are connected between the linkage point of the connections of the electronic switches (Q5, Q6) on the secondary side—which face away from the transformer (T)— and the pole of the source of d.c. voltage (B)—which faces away from the transformer (T).

* * * * *

UNITED STATES PATENT AND TRADEMARK OFFICE
CERTIFICATE OF CORRECTION

PATENT NO. : 5,436,825
DATED : July 25, 1995
INVENTOR(S) : Wawra et al.

It is certified that error appears in the above-indentified patent and that said Letters Patent is hereby corrected as shown below:

On the Title page, item [73] after "Assignee: SILENT MOTORS," there should be inserted --Elektrofahrzeuge und -antriebe, Entwicklung und Beratung Gesellschaft m.b.H.--.

Signed and Sealed this

Third Day of September, 1996

Attest:

BRUCE LEHMAN

Attesting Officer

Commissioner of Patents and Trademarks